US010909061B2

(12) United States Patent
Green

(10) Patent No.: US 10,909,061 B2
(45) Date of Patent: *Feb. 2, 2021

(54) METHOD, APPARATUS AND SYSTEM FOR CHANGING TO WHICH REMOTE DEVICE A LOCAL DEVICE IS IN COMMUNICATION VIA A COMMUNICATION MEDIUM THROUGH USE OF INTERRUPTION OF THE COMMUNICATION MEDIUM

(71) Applicant: Thinklogical, LLC, Milford, CT (US)

(72) Inventor: Martin Green, Shelton, CT (US)

(73) Assignee: THINKLOGICAL, LLC, Milford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/554,787

(22) Filed: Aug. 29, 2019

(65) Prior Publication Data
US 2019/0384732 A1   Dec. 19, 2019

Related U.S. Application Data

(63) Continuation of application No. 15/593,462, filed on May 12, 2017, now Pat. No. 10,417,157, which is a
(Continued)

(51) Int. Cl.
*G06F 13/40* (2006.01)
*G06F 3/14* (2006.01)
(Continued)

(52) U.S. Cl.
CPC ............ *G06F 13/4022* (2013.01); *G06F 3/14* (2013.01); *G06F 13/24* (2013.01); *G06F 21/82* (2013.01);
(Continued)

(58) Field of Classification Search
None
See application file for complete search history.

(56) References Cited

U.S. PATENT DOCUMENTS 6,037,925 A * 3/2000 Kim ..................... G09G 3/3611
345/99
7,295,578 B1 * 11/2007 Lyle .......................... G06F 3/14
348/473
(Continued)

FOREIGN PATENT DOCUMENTS

WO   2005125207 A2   12/2005
WO   2008148191 A2   12/2008

OTHER PUBLICATIONS

EP Search Report for Application No. 13161543.7 dated Sep. 10, 2014, 6 pages, (EP application related to U.S. Appl. No. 13/433,970).

*Primary Examiner* — Henry Tsai
*Assistant Examiner* — Christopher A Bartels
(74) *Attorney, Agent, or Firm* — Cantor Colburn LLP

(57) ABSTRACT

A communication system includes: a transmitter configured to be responsive to a control request from a local device that facilitates toggling of the transmitter On and Off in a pattern of interruption to generate multiple consecutive On/Off bits having On/Off signals with a same pulse width that represents control information, the transmitter configured to transmit data via a communication medium at a first end thereof, the communication medium also having a second end; and, in response to the pattern of interruption, the transmitter is configured to interrupt the communication medium at the first end, each interrupting of the communication medium at the first end resulting in a detection of a loss of signal at the second end.

38 Claims, 10 Drawing Sheets

Related U.S. Application Data continuation of application No. 13/433,970, filed on Mar. 29, 2012, now Pat. No. 9,653,039.

(51) Int. Cl.
*G06F 13/24* (2006.01)
*G06F 21/82* (2013.01)
*G09G 5/00* (2006.01)

(52) U.S. Cl.
CPC ......... *G09G 5/006* (2013.01); *G09G 2370/24* (2013.01)

(56) References Cited

U.S. PATENT DOCUMENTS

| | | | |
|---|---|---|---|
| 8,706,921 B2 | 4/2014 | Zadigian et al. | |
| 9,398,072 B2* | 7/2016 | Blackwell | G06F 13/12 |
| 2002/0178411 A1 | 11/2002 | Kohda | |
| 2004/0148391 A1 | 7/2004 | Lake, Sr. et al. | |
| 2005/0044186 A1* | 2/2005 | Petrisor | H04N 21/4363 709/219 |
| 2005/0049976 A1 | 3/2005 | Yang | |
| 2005/0185654 A1 | 8/2005 | Zadikian et al. | |
| 2006/0107295 A1 | 5/2006 | Margis et al. | |
| 2006/0173781 A1 | 8/2006 | Donner et al. | |
| 2006/0251419 A1 | 11/2006 | Zadikian et al. | |
| 2009/0214221 A1* | 8/2009 | Li | H04B 10/40 398/136 |
| 2009/0297161 A1* | 12/2009 | Ojima | H04J 3/0688 398/135 |
| 2010/0215359 A1* | 8/2010 | Li | H04B 10/40 398/22 |
| 2011/0268443 A1* | 11/2011 | Adler | H04Q 11/0067 398/58 |
| 2012/0155478 A1 | 6/2012 | Lake et al. | |
| 2012/0173769 A1 | 7/2012 | Loo | |
| 2012/0177361 A1* | 7/2012 | Hirano | H04Q 11/0067 398/1 |
| 2014/0056594 A1* | 2/2014 | Ding | H04L 1/0057 398/136 |
| 2017/0249273 A1 | 8/2017 | Green | |

* cited by examiner

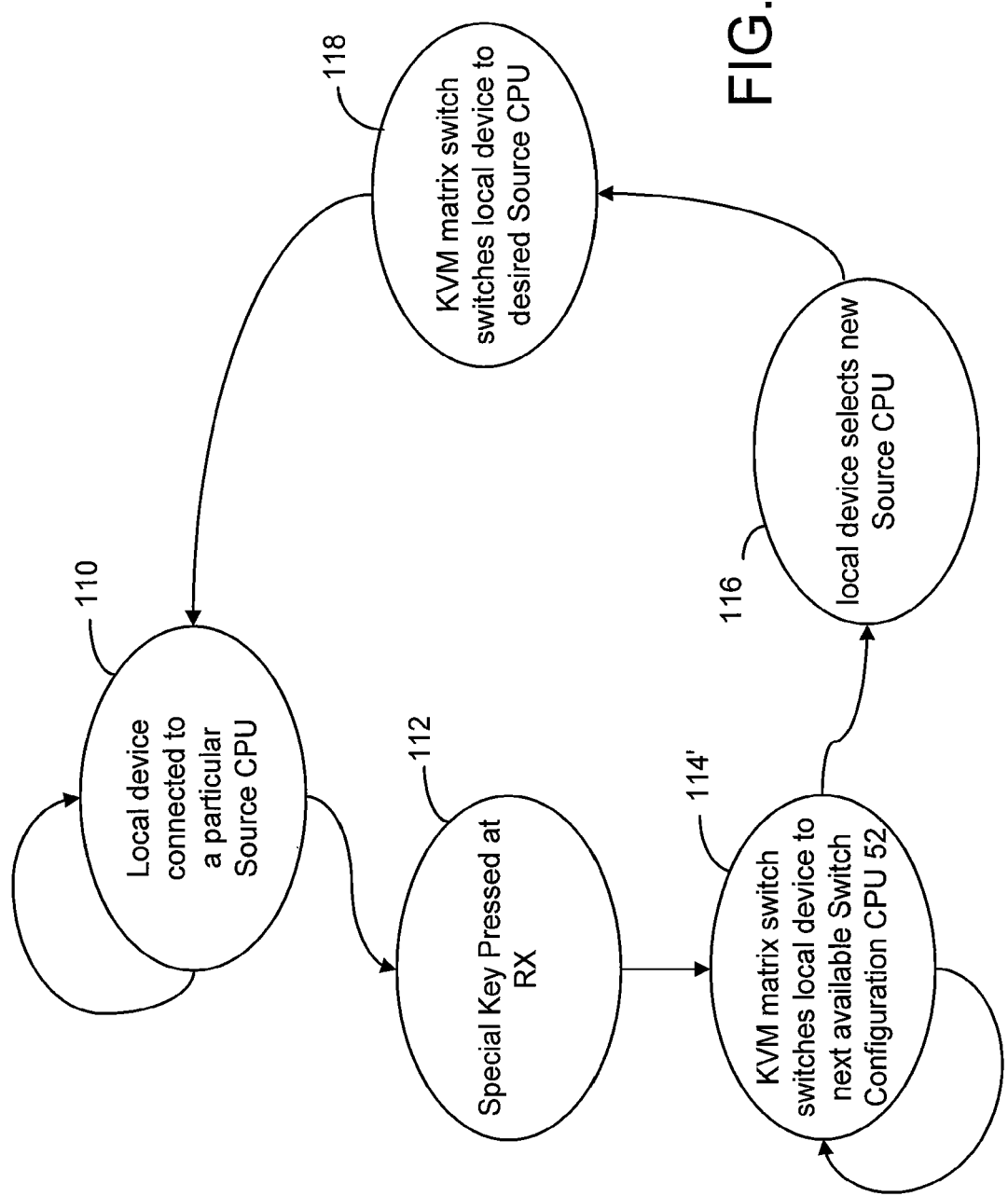

METHOD, APPARATUS AND SYSTEM FOR CHANGING TO WHICH REMOTE DEVICE A LOCAL DEVICE IS IN COMMUNICATION VIA A COMMUNICATION MEDIUM THROUGH USE OF INTERRUPTION OF THE COMMUNICATION MEDIUM

CROSS REFERENCE TO RELATED APPLICATIONS

This application is a continuation of U.S. application Ser. No. 15/593,462, filed May 12, 2017, which is a continuation application of U.S. application Ser. No. 13/433,970, filed Mar. 29, 2012, which are hereby incorporated by reference in their entireties.

BACKGROUND OF THE INVENTION

The present invention relates to keyboard, video, mouse (KVM) extension systems in conjunction with KVM matrix switches. Keyboard video mouse (KVM) extension systems are known in the art which allow for a KVM local device (destination user) to communicate with one of a plurality of remote devices (Source CPUs) by connecting the local device to a communication medium (such as a fiber optic cable) via a KVM receiver extender. The local device has a KVM receiver extender that connects to a first end of a communication medium. A second end of the communication medium connects to a KVM matrix switch. The KVM matrix switch connects the local device to a selected Source CPU. The Source CPU typically communicates to the KVM matrix switch via a KVM transmitter extender and a communication medium, such as a fiber optic cable. The KVM matrix switch is thus used to make the connections between the local devices (destination users) and the remote devices (Source CPUs). There is therefore a bi-directional communication path between each local device through the KVM matrix switch to a particular remote device.

There may be times when the local device wishes to communicate with the KVM switch so as to instruct the KVM matrix switch to connect it to a particular remote device. In controlled environments which prohibit the manipulation or insertion of data into the high speed communication medium data stream between the local device and the remote device, there have been relatively limited means for allowing a local device to communicate with the KVM matrix switch. There have been methods which employ use of a separate data connection between the local device and the KVM matrix switch, such as via use of an Ethernet, serial communication, USB communication or other communication path. However, this arrangement typically requires additional cables, interfaces and the like, and may introduce additional security issues.

One such method used in the art is a control device such as a switch configuration CPU which the local device (e.g., User CPU 23) can communicate with via an Internet connection (internet cloud 25). As seen in FIG. 1, the local device then can instruct a switch configuration CPU over the Internet to command the KVM matrix switch to connect the local device to a particular Source CPU. However, such an arrangement has its own security issues, including the use of the Internet to communicate with the switch configuration CPU as well as the need for the local device to have a CPU for communication with the Internet.

The present invention provides a solution to such security issues. It allows a local device to select a desired remote device (Source CPU) without the manipulation or insertion of data in the high speed data path of the communication medium between the local device and the remote device.

SUMMARY OF THE INVENTION

An embodiment includes a communication system, having: a transmitter configured to be responsive to a control request from a local device that facilitates toggling of the transmitter On and Off in a pattern of interruption to generate multiple consecutive On/Off bits having On/Off signals with a same pulse width that represents control information, the transmitter configured to transmit data via a communication medium at a first end thereof, the communication medium also having a second end; and, in response to the pattern of interruption, the transmitter is configured to interrupt the communication medium at the first end, each interrupting of the communication medium at the first end resulting in a detection of a loss of signal at the second end.

Another embodiment includes a communication system, having: a keyboard, video, mouse, (KVM), local device; and an input/output (I/O) device; wherein the KVM local device is configured to be toggled between a first state and a second state so as to generate a toggling pattern, the KVM local device being configured to be maintained in the first state during a first duration, and to be maintained in the second state during a second duration that matches the first duration; wherein the I/O device is configured to detect the toggling pattern generated in response to the KVM local device being toggled between the first state and the second state; and, wherein the I/O device is configured to facilitate secure switching of communications from between the KVM local device and a first remote device to between the KVM local device and a second remote device based on the detected toggling pattern.

BRIEF DESCRIPTION OF THE DRAWINGS

For a full understanding of the nature and objects of the present invention, reference is made to the following detailed description taken in conjunction with the drawings in which:

FIG. 12 is another state diagram of a local device switching connection from one remote device to another remote device.

DETAILED DESCRIPTION

Figure 2:
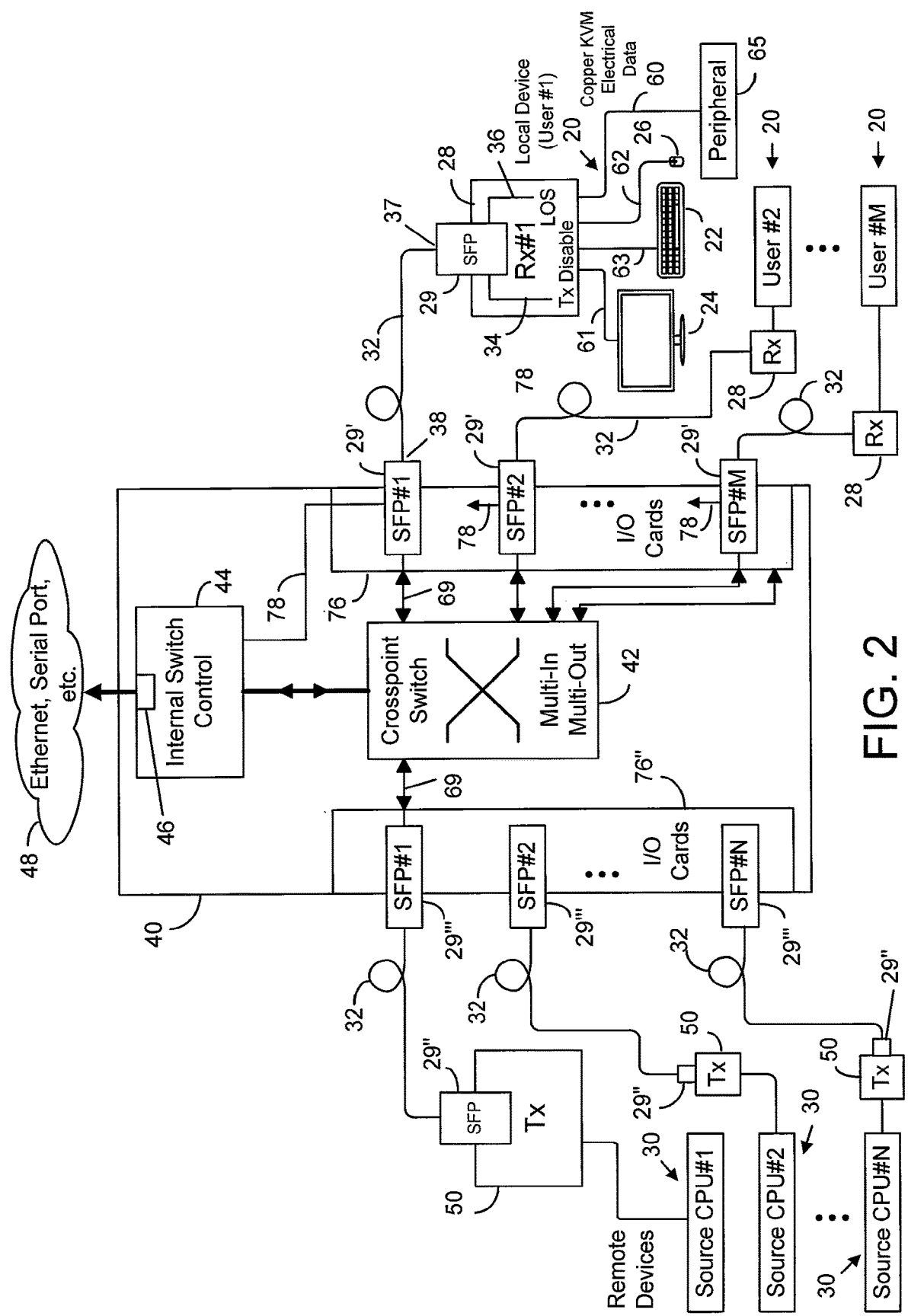
FIG. 2 is an overall architectural diagram of an embodiment of the present invention for allowing a local device (destination user) to switch from one Source CPU remote device to another.

As best seen in FIG. 2, the present invention is directed to a method and system of communicating between any one of a plurality of local devices 20 (sometimes referred to as destination users or local users) and any one of a plurality of remote devices, such as Source CPUs 30 and switch configuration device 52 (e.g. Switch Configuration CPUs 52—see embodiment shown in FIG. 3—), by use of a keyboard, video, mouse (KVM) matrix switch 40. Each local device typically has a keyboard 22, video monitor 24, and mouse 26 to allow the user to interact with a remote device 30 to which it is ultimately connected. Each local device also has a keyboard, video, mouse (KVM) receiver extender 28 which in turn typically includes a Small Formfactor Pluggable transceiver (SFP) 29. Such a transceiver is well-known in the art (see SFF Committee INF-8074i Specification for SFP (Smallformfactor Pluggable) transceiver, Rev. 1.0 dated May 12, 2001), and of course includes a transmitter 31 and a receiver 33 (see FIG. 5).

The pin definition of the SFP transceiver includes a TX Disable input 34 (transmitter disable input), as well as a LOS status notification (loss of signal) output 36 which indicates the status of the signal on an associated communication medium 32, such as an optical fiber communication medium.

As seen in FIG. 2, the RX extender 28 communicates via the communication medium 32 at a first end 37 with the KVM matrix switch 40 via communication medium 32. The matrix switch also includes a transceiver 29, typically a small form factor pluggable transceiver, communicating with each optical fiber communication medium at a second end 38 of the communication medium. These transceivers are typically located on one or more I/O cards 76. A typical example of such an RX extender is the Velocity Receiver™ KVM-24 of Thinklogical, 100 Washington Street, Milford, Conn. 06460-3133, USA.

Similar to each RX extender associated with each local device, a transmitter (TX) extender 50 is associated with each remote device 30. Each transmitter extender is configured in a manner similar to the receiver extender. Thus, each transmitter extender communicates via communication medium 32' with the KVM matrix switch 40, where the KVM matrix switch 40 includes a transceiver 29 for each transmitter extender having a configuration similar to the transceivers associated with the RX extenders. These transceivers may also be located on one or more I/O cards 76. A typical example of such a TX extender is the Velocity Transmitter™ KVM-24 of Thinklogical, 100 Washington Street, Milford, Conn. 06460-3133, USA.

As known in the art, the KVM matrix switch 40 provides the functionality necessary to make a connection between any local device 20 and any remote device 30. It performs this function by a crosspoint switch 42 under the control of an internal switch control 44. The internal switch control can include an I/O port 46 for connection to an external device via a network or other communication medium 48. A typical example of such a KVM matrix switch is the VX40™ KVM matrix switch of Thinklogical, 100 Washington Street, Milford, Conn. 06460-3133, USA.

Figure 1:
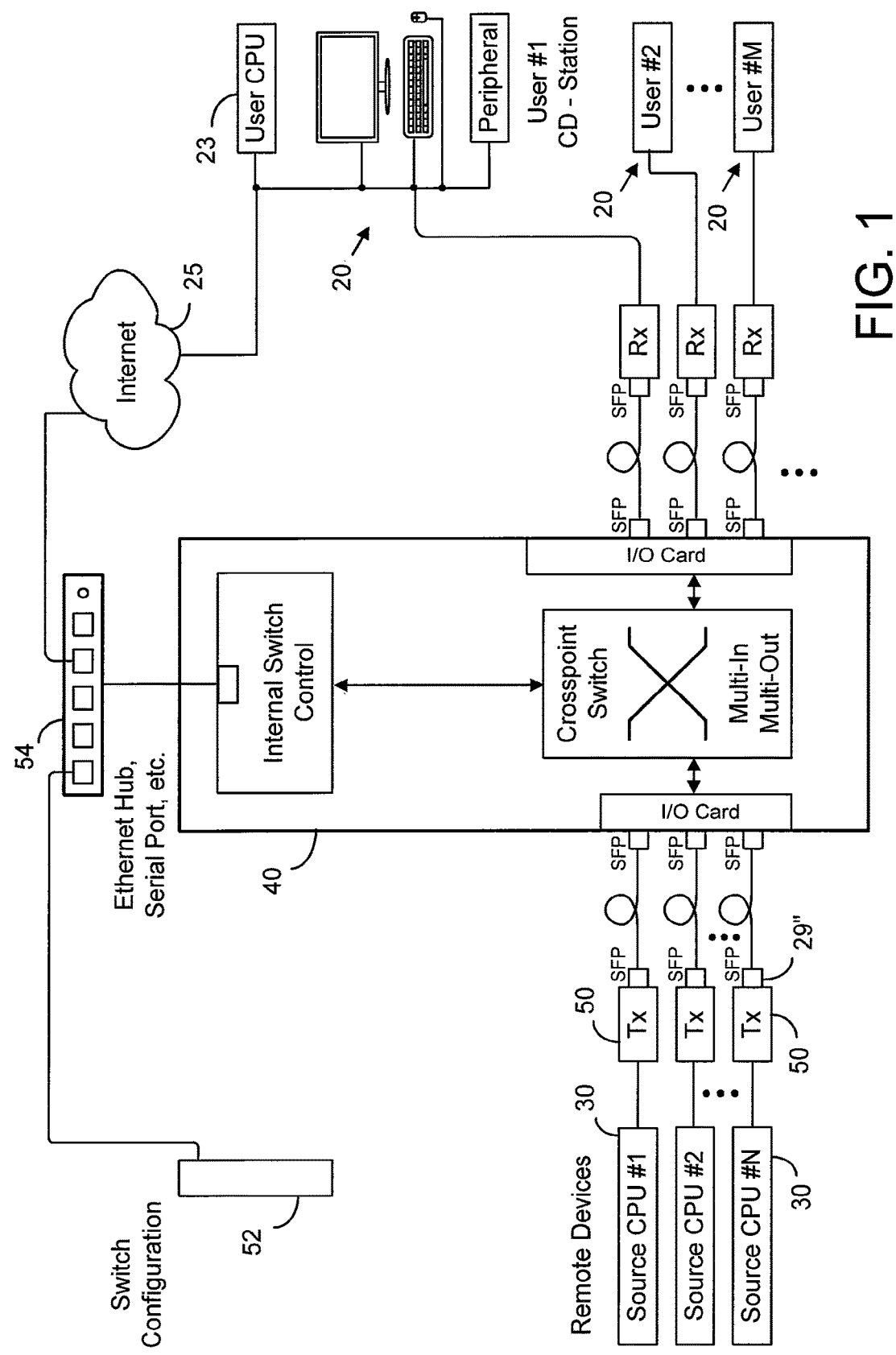
FIG. 1 is an overall diagram of the state of the art showing multiple local devices (destination users) each communicating with one of a plurality of remote devices (Source CPUs) by use of high speed communication medium in combination with respective transceivers and a KVM matrix switch and further showing control of the matrix switch by a switch configuration device.

In some prior art systems, it is permissible for a local device to communicate with a KVM switch via an external device, such as Switch Configuration CPU 52, which in turn communicates with the KVM switch through its internal switch control 44. In the prior art, as seen in FIG. 1, this has typically been done via a network 48. This causes security concerns since a local device may have its communications with the Switch Configuration CPU compromised. However, in many applications, especially applications requiring secure environments, it is impermissible for the local device to have such unsecured communications. It is also not permissible in some secure environments for the local device to insert control commands into the data stream on the high speed communication medium.

Figure 5:
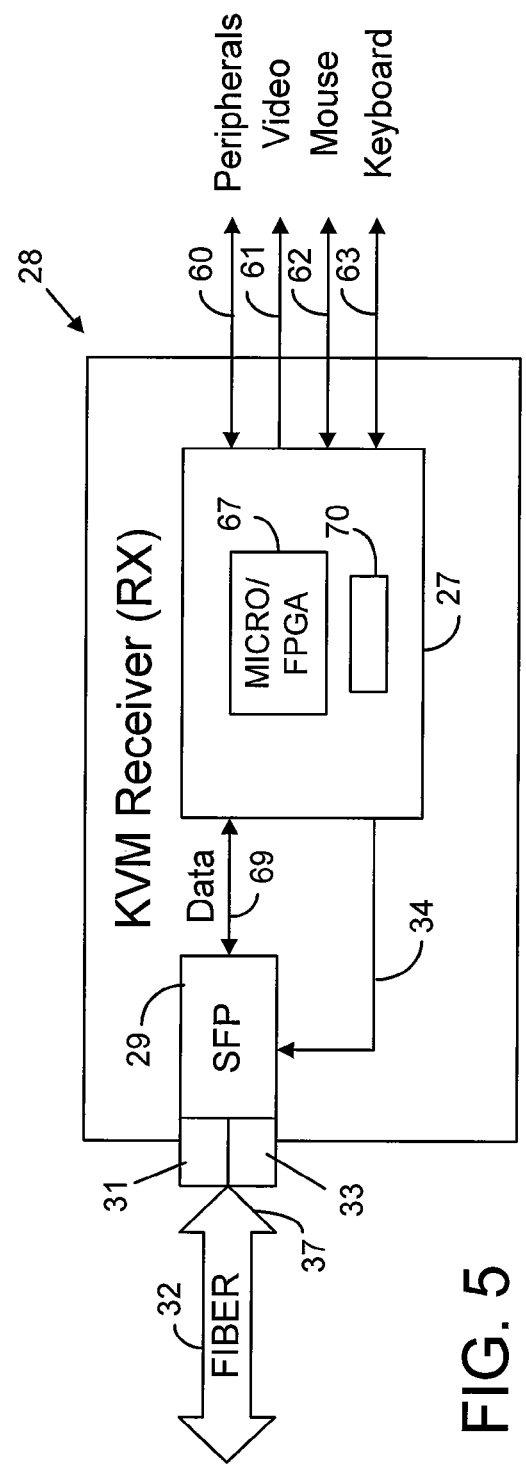
FIG. 5 is a block diagram of a keyboard, video, mouse receiver extender (RX) according to the present invention.

The present invention provides a solution to this problem by providing a mechanism that allows a local device to communicate with the KVM matrix switch in a manner that does not insert control commands into the high speed communication medium data stream and does not use a separate communication path between the local device and a Switch Configuration CPU. Details of the KVM receiver extender 28 are shown in FIG. 5. As there seen, the receiver extender 28 has a module 27 that includes interfaces 60, 61, 62, and 63 for interfacing with peripherals 65, video monitor 24, mouse 26, and keyboard 22, all of which form part of a local device 20, such User #1 shown in FIG. 2. The receiver extender includes a microprocessor or field programmable gate array (FPGA) 67 for communicating between peripherals, monitor, mouse, and keyboard associated with the local device and with high speed data 69 associated with the transceiver 29 for communication on the high speed communication medium 32, such as a fiber optic cable. The microprocessor and/or field programmable gate array 67 includes computer memory 70 for execution of instructions for performing the functions of the KVM receiver extender, including the specific functions discussed below. Such instructions can be hard wired within the field programmable gate array and thus the logical functions of the field programmable gate array can be commensurate with a microprocessor under program control where the program instructions are stored in computer memory 70.

The KVM transmitter extender 50 has a similar architecture as the KVM receiver extender.

Figure 6:
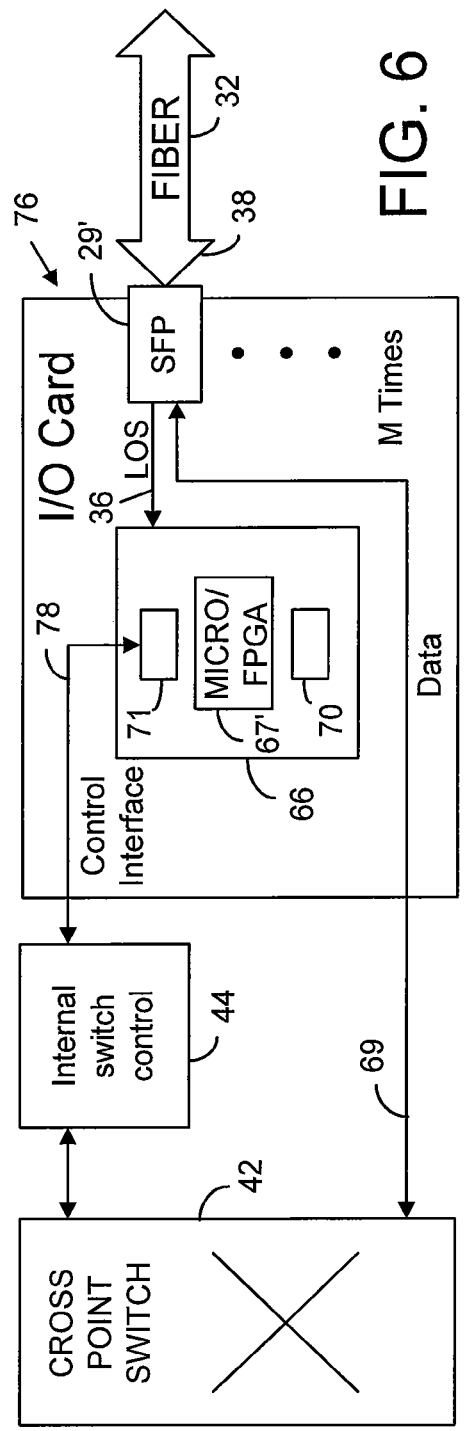
FIG. 6 is an overall block diagram of a portion of an I/O card associated with a KVM matrix switch of the present invention.
Figure 9:
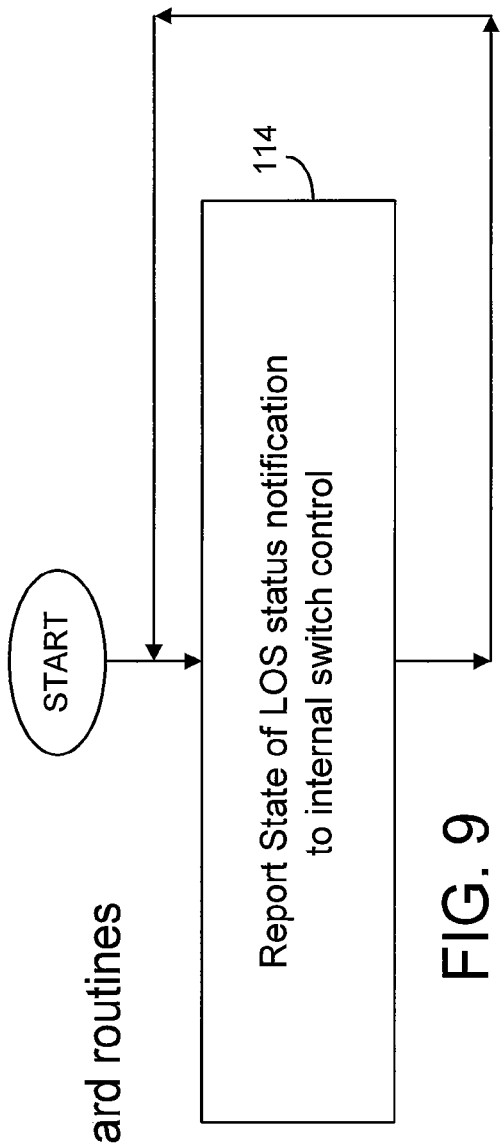
FIG. 9 is a flow chart of the operation of the I/O card associated with one of the local devices for a second embodiment of the present invention.

FIG. 6 is a block diagram of a portion of the input/output card 76 associated with the KVM matrix switch 40. As seen, the high speed communication medium 32 communicates with transceiver 29. The I/O card 76 includes an input module 66 having a microprocessor/FPGA 67' with associated memory 70 and also includes a control interface 78 for communicating control information with an internal switch control 44 of the matrix switch 40. This processor module is typically configured differently from the processor module 67 of the RX extender 28 shown in FIG. 5. The internal switch control in turn communicates with the multi-in/multi-out crosspoint switch 42 of switch 40 for making the interconnection between a particular local device 20 and a particular remote device 30. Thus, a particular local device, such as User #1 may communicate with any one of the N Source CPUs. This is true for the remaining users; i.e., User #2 . . . User #M, where M and N are positive integers.

As seen in FIG. 6, the LOS status notification signal 36 is communicated from transceiver 29 to the microprocessor/ FPGA 67' for purposes of detecting loss of signal on high speed communication medium 32.

Methodology

An underlying concept of the present invention is the use of interruption of the communication medium as a technique for communicating with the KVM matrix switch so as to allow a local device to select which remote device communication is desired. Interruption of the communication medium is a loss of carrier. For an optical fiber, it is typically loss of optical power (see e.g., SFF Committee INF-listed above). For other types of communication medium it can be loss of carrier e.g. carrier frequency for a radio frequency communication) or loss of carrier (e.g. carrier frequency over a coaxial cable or twisted pair conductors).

Figure 7:
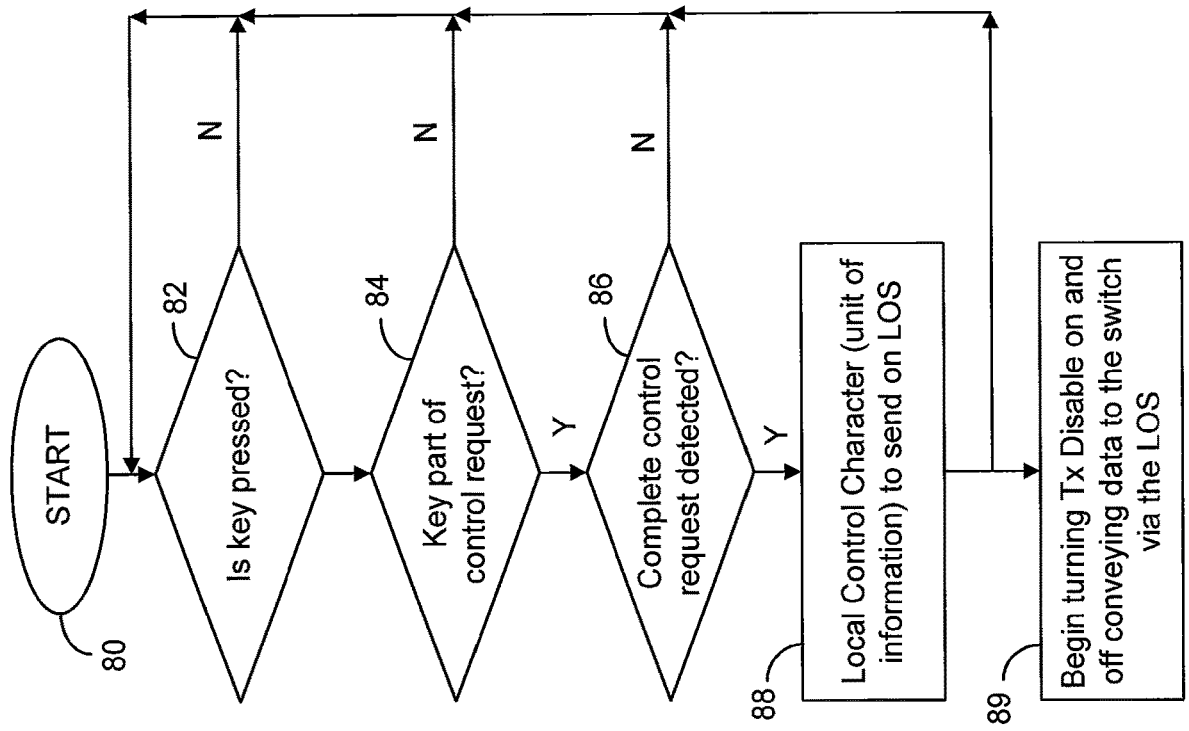
FIG. 7 is a flow chart of the operation of the I/O receiver extender in association with a local device keyboard.

FIG. 7 is a flow chart that shows one embodiment of the present invention from the perspective of local device. The routine starts at starting point 80. Decision step 82 determines if a key is pressed, such as on keyboard 22 (see FIG. 2). If a key is pressed (Y) a determination is made as to whether a part of control request has been made (decision 84). If a part of a control request has been made (decision Y), a decision is made as to whether a complete control request has been detected (decision 86).

Thus, for example, a key part of a control request is detected at decision step 84 and may be part of an overall key sequence. Only if the entire control request is detected does decision step 86 answer YES so that a unit of information (such as a control character) is loaded in the RX extender 28 for sending via toggling the TX disable line 340*n* and Off, and thereby to cause transceiver 29 to interrupt the communication medium 32 (turn the communication medium On and Off). For a fiber optic cable, this can be accomplished by turning the optical fiber laser or LED On and Off. For other types of communication medium, such as coaxial cable or twisted pair conductors, this can be accomplished by turning the carrier signal On and Off.

Thus, for example, if a particular complete control request is detected, such as control-A followed by control-B, the control request detected step 86 is answered affirmatively, at which point a multi-bit unit of information (e.g., a control character), such as, for example, the ASCII character for the numeral 1, is loaded in the RX extender (step 88) to in turn be sent via TX disable to turn optical fiber power On and Off (step 89).

Figure 4:
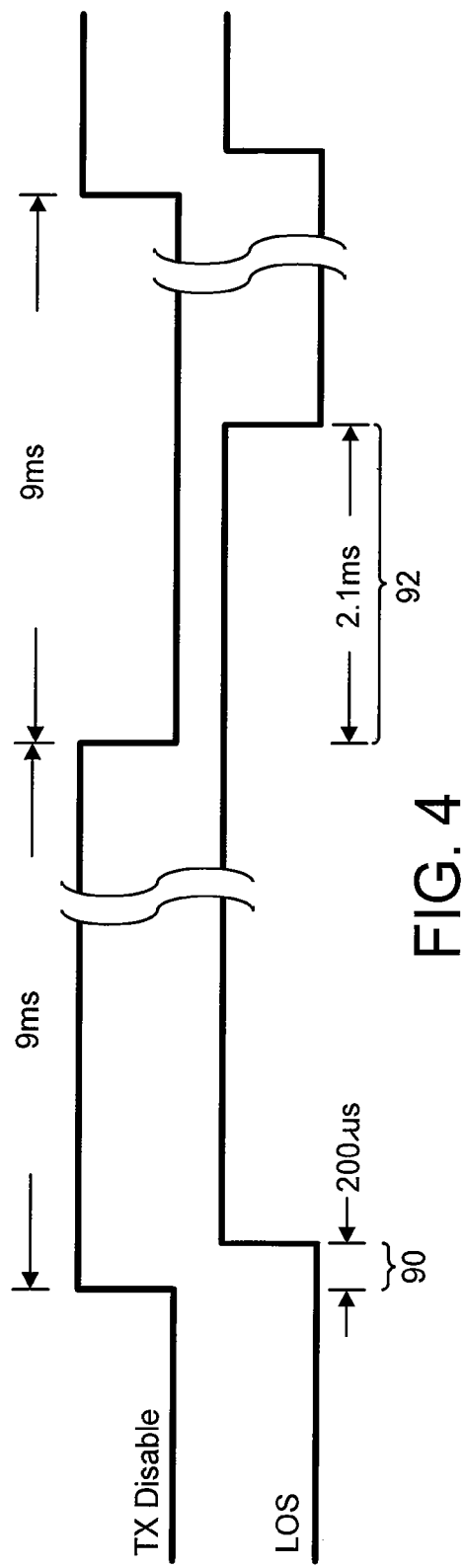
FIG. 4 is a waveform diagram illustrating the relationship between a transmit disable signal, that causes interruption of a communication medium at one end thereof, and a loss of signal (LOS) status notification as detected at a second end of the communication medium.

FIG. 4 is a typical waveform that illustrates how a unit of information is communicated, such as the above-mentioned ASCII character for the number 1. Thus, because of minimum time durations for interpreting a loss of signal (loss of optical power) on the LOS status notification pin of a receiving transceiver 29' at the KVM matrix switch 40, as well as the time duration necessary for the communication medium to be active (optical power present) for the LOS status notification to indicate such optical power present, it is necessary that the communication medium be turned On and Off at a relatively slow rate in order to convey a unit of information. Such a communication rate can be 110 baud, for example.

Typically, for specifications associated with small form factor (SFP) pluggable transceivers, there is approximately a 200 microsecond delay between the actual turn off of the communication medium (loss of optical power) and the detection of the loss of signal via the LOS status notification (LOS status notification High) at the receiving end of the communication medium. For example, if the User #1 RX extender 28 turns Off the communication medium (TX disable signal goes high), that turn off of the communication medium 32 requires at least 200 microseconds before it is detected at the SFP associated with the communication medium at its second end (connected to the matrix switch 40) (that is, LOS is true or high). This is seen in FIG. 4 as time delay 90.

In addition, there is a time delay 92 of up to 2.1 milliseconds that is required (after the communication medium becomes active—optical power present—i.e. TX disable low of off), before the LOS status notification at SFP 29' goes low (indicating that the communication medium optical power has turned on).

As seen in FIG. 4, the TX disable signal typically would have an On duration of approximately 9 milliseconds to denote an ON state (TX disable true) and a 9 millisecond low state to denote a TX disable OFF state. Multiple consecutive On or Off bits are generated by keeping TX disable Off or On respectively for multiples of this 9 millisecond time period (110 baud example). Other durations, of course, could be used as long as the interruption of the communication medium (e.g. optical power ON and optical power OFF) can be accurately detected by the loss of signal status notification 36 at the far end of the communication medium (SFP 29').

As seen in FIG. 6, the I/O card 76 associated with the KVM matrix switch 40 contains one or more transceivers 29' for receipt of communications over the communication mediums 32 from local devices 20. The loss of signal status notification 36 from transceiver 29' communicates with processor module 67'. The processor module 67' in one embodiment determines the status of the LOS status notification 36 to determine whether a bit of information has been received by the LOS status notification.

Figure 8:
FIG. 8 is a flow chart of the operation of the I/O card associated with one of the local devices.

FIG. 8 shows a flow chart for the I/O card making the determination of whether a unit of information has been received via the LOS status notification and, if so, the unit of information stored in buffer 71 and transferred to the internal switch control 44 via control interface 78. At step 120, the routine waits for LOS status notification and at step 122 waits 1 bit time to clear a bit counter. At step 124 the LOS status notification pin is sampled one or more times to obtain one bit of information of the multi-bit unit of information (multiple sampling of the LOS status notification pin per bit time duration may help ensure reliable determination of the high or low value of the LOS status notification pin). The routine then waits one bit time at step 126, increments the bit counter at step 128 and determines if a full unit of information has been received at step 130. If a unit of information is received (step 130=N) then the unit of information is transferred at step 132 via control interface 78 to the internal switch control 44.

Figure 10:
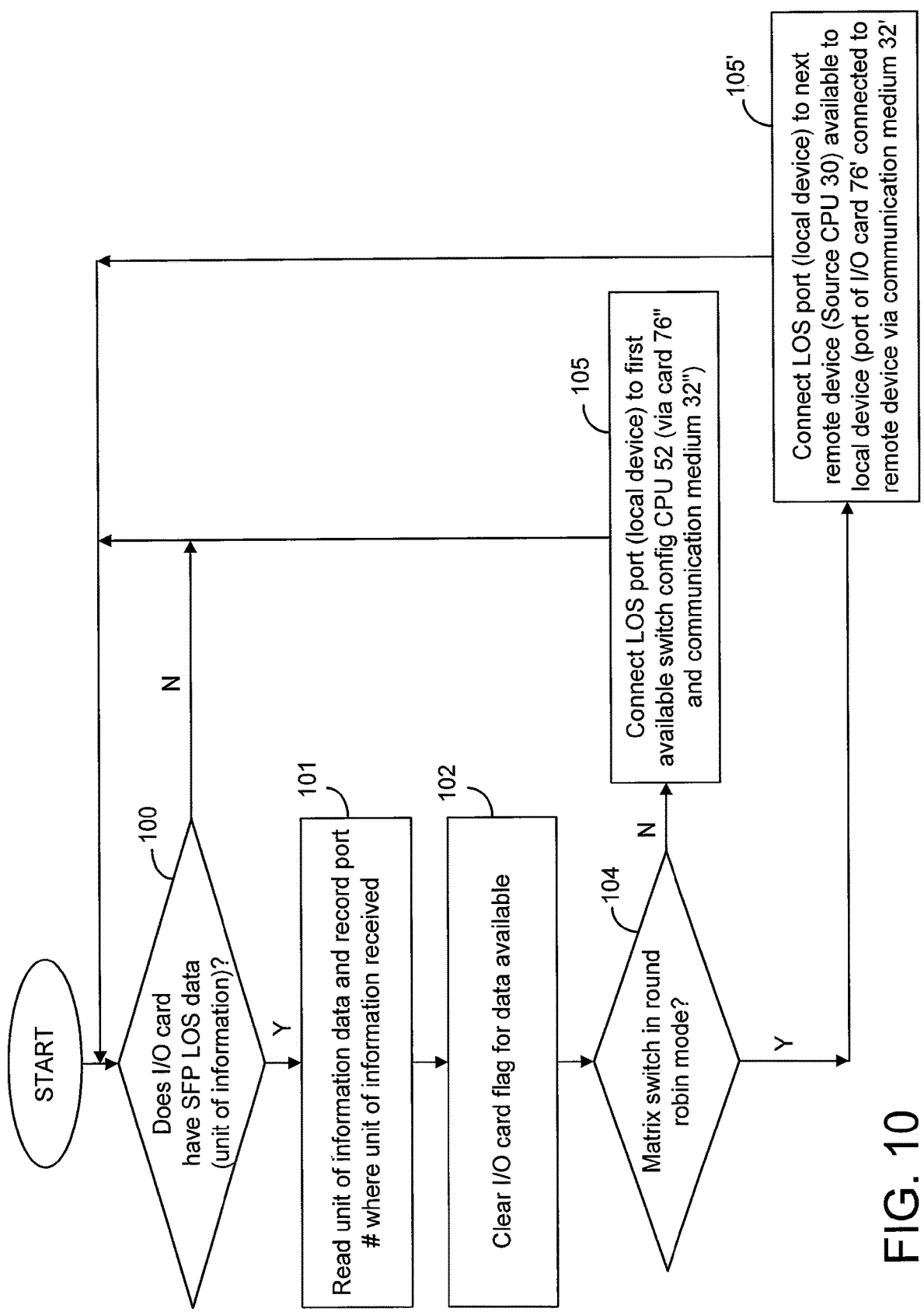
FIG. 10 is a flow chart of the switch control of the internal switch control of the KVM matrix switch.

Alternatively, as shown in FIG. 10, the processor module 67' of the I/O card at step 114 can report the status of the LOS status notification line 36 to the internal switch control 44 via control interface 78, where the internal switch control then performs the determination of receipt of the unit of information (control character) by accumulating such bits in a manner similar to that shown in the flow chart of FIG. 8.

In either embodiment, the unit of information (e.g., a control character) is conveyed from the local device 20 to the internal switch control 44 of KVM matrix switch 40 via interruption of the communication medium 32 between the local device and the KVM matrix switch.

Figure 3:
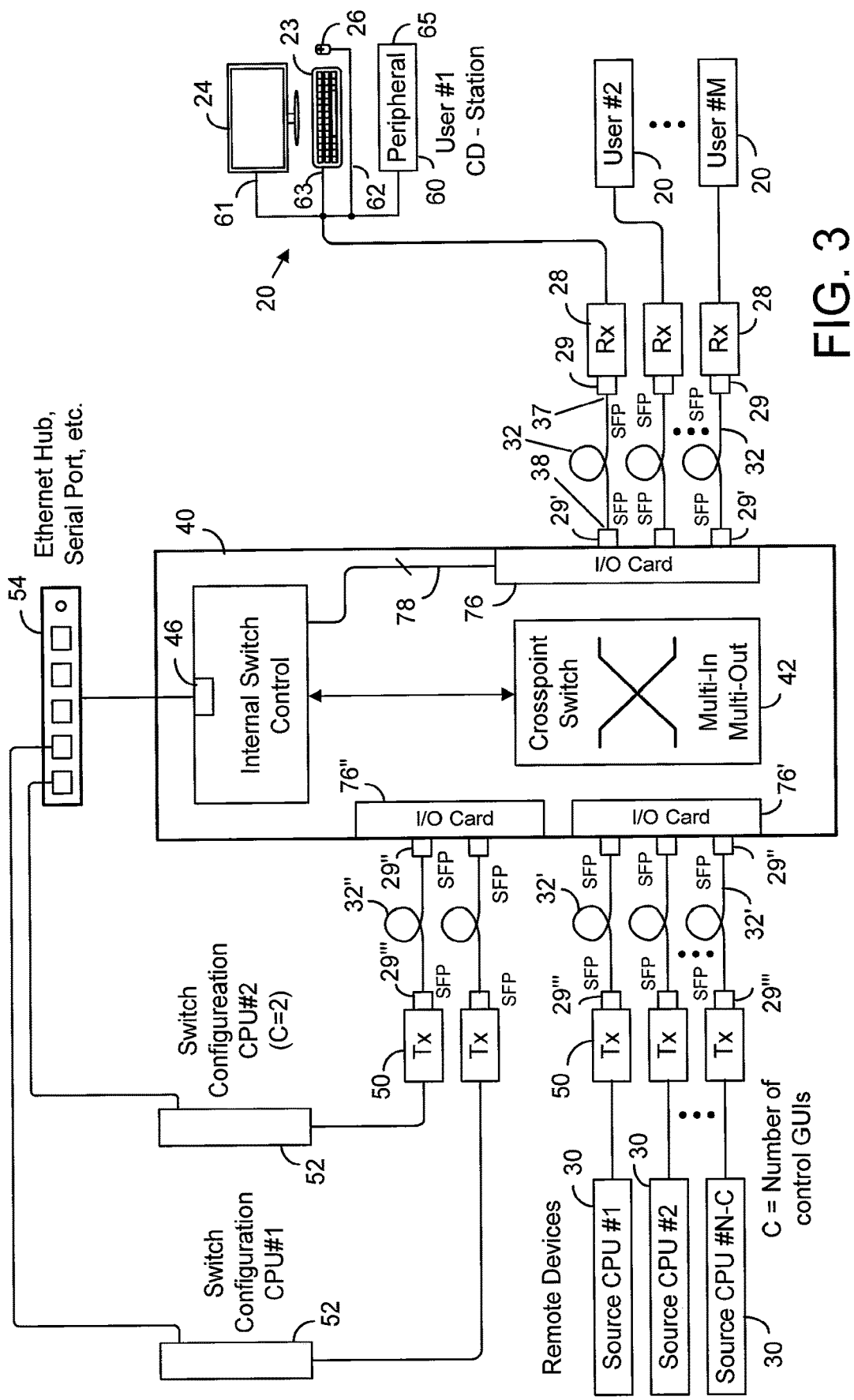
FIG. 3 is an overall architectural diagram of another embodiment of the present invention for allowing a local device (destination user) to switch from one remote device (Source CPU) to another via communication with a Switch Configuration CPU.

FIG. 6 shows details of the KVM matrix switch 40 as also shown in FIG. 2 with FIG. 10 illustrating a flow chart of the operation of the internal switch control 44 when a unit of information (e.g., control character) is received by interruption of the communication medium. Thus, at the decision step 100 a determination is made as to whether I/O card 76 has received a unit of information (control character). If it has, the unit of information received and the port of the I/O card where the unit of information was received is recorded (step 101) (I/O cards typically can have multiple SFP transceivers, each with a different port associated therewith). The I/O card flag is then cleared (step 102) and at step 104 the port is connected to the next available Source CPU 30 (step 105) or the next available Switch Configuration CPU 52 (step 105'). The former step (step 105) is selected if the KVM matrix switch 40 is in a "Round Robin" mode (FIG. 2) and the latter selected (step 105') if the KVM matrix switch is not in the "Round Robin" mode (FIG. 3). It should be noted that the step of reading the unit of information (control character) can be performed by either reading the control character at the I/O card or by the internal switch control determining that the bits received via the LOS status notification represent a unit of information (control character). The multi-in/multi-out (cross-point) switch 42 of matrix switch 40 then connects the port on which the communication medium transmitted the information unit (control character) to the next available switch configuration CPU 52 as seen in FIG. 3.

In the embodiment shown in FIG. 3 there are two Switch Configuration CPUs (Switch Configuration CPU #1 and Switch Configuration CPU #2) and thus a local device, such as User #1 that had communicated a unit of information by interruption of the communication medium, would, upon detection of the unit of information at the KVM matrix switch, be connected to the next available Switch Configuration CPU, such as Switch Configuration CPU #1, if this Switch Configuration CPU is not servicing another local device.

Once the local device is connected to a Switch Configuration CPU, it communicates therewith via the communication medium 32 using the communication medium high speed data path. The local device can then instruct the Switch Configuration CPU to cause the KVM matrix switch to control its multi-in/multi-out switch 42 for connecting the local device to any desired Source CPU 30, such as remote device Source CPU #2. To do this, the switch configuration CPU communicates via an Ethernet hub (or other communication path, e.g., RS232, RS422, etc.) to the internal switch control 44 of matrix switch 40. The internal switch control in turn controls the cross point switch 42 thereby connecting the user station (local device) to the desired Source CPU 30. The Switch Configuration CPU 52 normally provides a graphical user interface to the local device, thereby facilitating user interaction with the Switch Configuration CPU for purposes of allowing the local device to instruct the Switch Configuration CPU to select the desired Source CPU that the local device desires to communicate with.

In another embodiment, the unit of information that causes the system to switch the connection of the local device to the next available Source CPU 30 or Switch Configuration CPU 52, can be a simple On and Off toggling of the communication medium some minimum number of times over a period of time, such as toggling communication medium 320n and Off every 6 milliseconds for at least 18 milliseconds. Once this toggling is determined, decision step 104 can be invoked.

Figure 11:
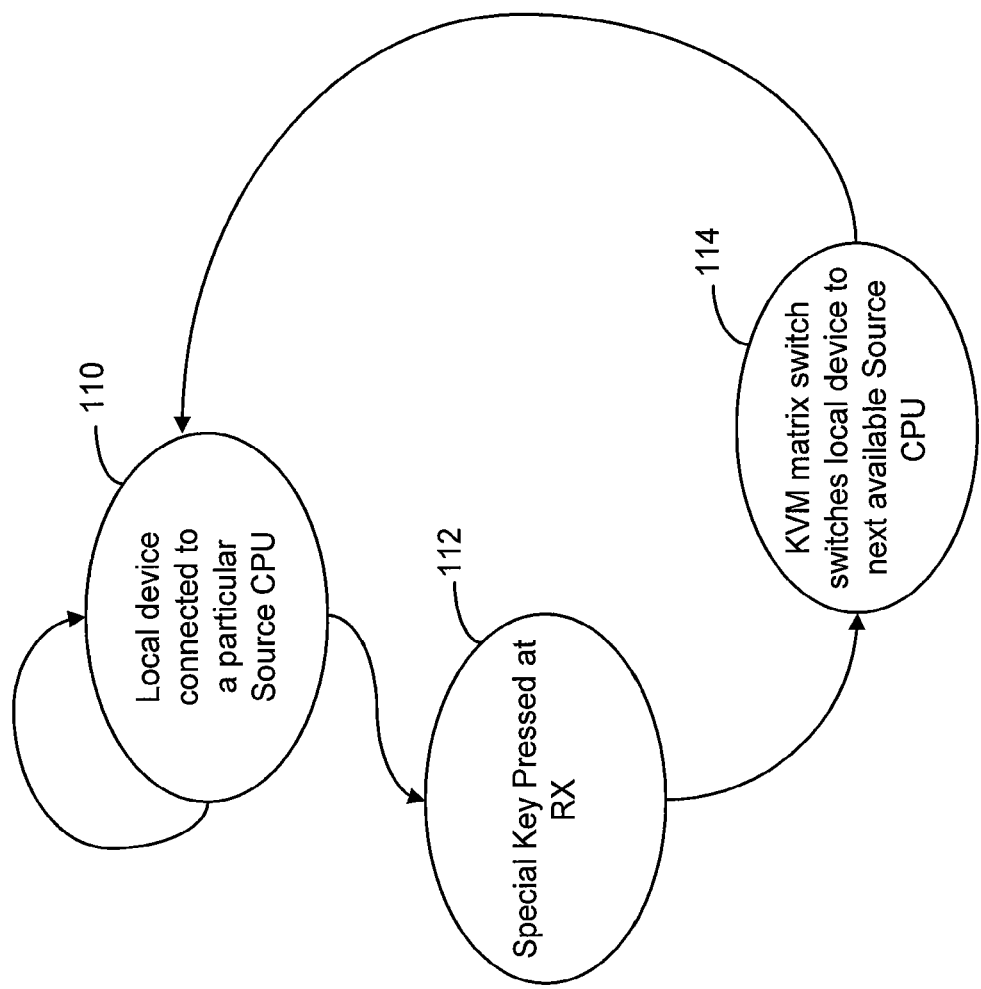
FIG. 11 is a state diagram of a local device switching connection from one remote device to another remote device.

Thus, the mode of operation of the present invention is different in at least two embodiments of the present invention. In one embodiment, as illustrated in FIGS. 2 and 11, the local device initially is in an initial state 110 in which the local device 20 (e.g., User #3) is connected to a particular Source CPU 30 (e.g., Source CPU #2). The user maintains this state until the user presses a particular control key sequence via keyboard 22. This action, denoted by reference numeral 112, causes the RX extender 28 associated with this user to connect to the next available Source CPU 30 (e.g., Source CPU #3). Thus, the user is connected via KVM matrix switch 40 (state 114) to a specific Source CPU and remains connected to that Source CPU until the user enters a control sequence via its associated keyboard 22 and if this action occurs, then the user is connected to the next available Source CPU (user port of the local device connected to next available Source CPU). To cause this to occur, the communication medium 32 between the local device and the KVM matrix switch 40 is interrupted via toggling with a bit pattern corresponding to the control character that instructs the KVM matrix switch to connect the port associated with the user to the next available Source CPU. Depending upon the value of the unit of information sent to the KVM matrix switch, the next available Source CPU could be the next sequentially higher Source CPU (for one value of the unit of information) or the next sequentially lower Source CPU (for another value of the unit of information).

FIG. 12 is a second mode of operation similar to that shown in FIG. 11, wherein the local device 20 (e.g., User #5) is connected to a specific Source CPU (state 110) (e.g., Source CPU #8) until a control sequence is entered via its associated keyboard 22 (state 112) which, if it occurs, causes the communication medium to be interrupted via toggling by the transceiver at the RX extender such that it is interrupted by a unit of information. The KVM matrix switch upon such detection of the unit of information connects the user port of this local device to the next available Switch Configuration CPU 52 (step 114'). When this change of state occurs, the local device (user) is connected to a specific Switch Configuration CPU (e.g., switch configuration CPU #2) and communicates therewith via the communication medium 32 to allow the user (local device) to instruct the Switch Configuration CPU (state 116) to command the KVM matrix switch to cause the user port to be connected to a desired particular Source CPU 30 (state 118). This desired Source CPU information is conveyed to the Switch Configuration CPU via the user, such as via the keyboard 32 associated with the user.

Thus, in one embodiment, upon detection of a unit of information (control character) via interruption of the communication medium, the KVM matrix switch connects the port associated with the particular local device (user) to the next available Source CPU.

In another embodiment, upon detection of the unit of information (control character) via interruption of the communication medium between the user and the KVM matrix switch, the KVM matrix switch causes the port associated with the particular local device to be connected to the next available Switch Configuration CPU. When the user is connected to the next available Switch Configuration CPU, it communicates therewith via the communication medium in the normal fashion and thereby instructs the Switch Configuration CPU to connect the user to a desired Source CPU.

Embodiments of the present invention provide that the unit of information communicated via interruption of the communication medium can be detected either at the I/O card of the KVM matrix switch or at the internal switch control of the KVM matrix switch While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A communication system, comprising:
a transmitter configured to be responsive to a control request from a local device that facilitates toggling of the transmitter On and Off in a pattern of interruption to generate multiple consecutive On/Off bits having On/Off signals with a same pulse width that represents control information, the transmitter configured to transmit data via a communication medium at a first end thereof, the communication medium also having a second end;
in response to the pattern of interruption, the transmitter is configured to interrupt the communication medium at the first end, each interrupting of the communication medium at the first end resulting in a detection of a loss of signal at the second end.

2. The communication system of claim 1, further comprising:
a receiver configured to receive the data at the second end of the communication medium and having a loss of signal (LOS) status notification configured to detect the pattern of interruption of the communication medium;
the receiver configured to use a detection of a respective loss of signal at the second end for detecting the pattern of interruption of the communication medium at the second end so as to determine the control information, and in response to the detection to facilitate a change to which remote device of a plurality of remote devices the local device is in communication via the communication medium.

3. The communication system of claim 2, wherein:
the local device comprises a KVM local device.

4. The communication system of claim 3, wherein:
the KVM device comprises a keyboard, a monitor, and a mouse.

5. The communication system of claim 3, wherein:
the KVM local device is configured to communicate with the remote device without being in communication with the Internet.

6. The communication system of claim 2, wherein:
the local device comprises an Internet free device that is configured to communicate with the remote device without communication through the Internet.

7. The communication system of claim 2, wherein:
wherein the local device is configured to communicate with the remote device without communication through the Internet.

8. The communication system of claim 2, wherein:
the local device comprises a secure data communications device that is configured to change from which remote device of the plurality of remote devices the local device is in communication via the communication medium without inserting a control command into the communication medium.

9. The communication system of claim 8, wherein:
the local device that comprises the secure data communications device is further configured to change from which remote device of the plurality of remote devices the local device is in communication via the communication medium without using a communication path separate of the communication medium for the pattern of interruption between the local device and the remote device that the local device is in communication with.

10. The communication system of claim 2, wherein:
the local device comprises a secure data communications device that is configured to communicate with the remote device of the plurality of remote devices without manipulation of data communicated through the communication medium.

11. The communication system of claim 2, wherein:
the local device comprises a secure data communications device that is configured to switch communications among the plurality of remote devices without insertion of data communicated through the communication medium.

12. A communication system, comprising:
a keyboard, video, mouse, (KVM), local device; and
an input/output (I/O) device;
wherein the KVM local device is configured to be toggled between a first state and a second state so as to generate a toggling pattern, the KVM local device being configured to be maintained in the first state during a first duration, and to be maintained in the second state during a second duration that matches the first duration;
wherein the I/O device is configured to detect the toggling pattern generated in response to the KVM local device being toggled between the first state and the second state;
wherein the I/O device is configured to facilitate secure switching of communications from between the KVM local device and a first remote device to between the KVM local device and a second remote device based on the detected toggling pattern.

13. The communication system of claim 12, wherein:
wherein the toggling pattern comprises multiple consecutive first and second state signals with a same pulse width that represents control information associated with switching communications from between the KVM local device and the first remote device to between the KVM local device and the second remote device in response to the toggling pattern being detected.

14. The communication system of claim 12, wherein:
the toggling pattern is an On and Off pattern of interruption that generates multiple consecutive On/Off bits having On/Off signals with a same pulse width that represents control information.

15. The communication system of claim 13, wherein:
the KVM local device comprises an Internet free device that is configured to be switched from communicating with the first remote device to communicating with the second remove device without communication through the Internet.

16. The communication system of claim 13, wherein:
the KVM local device is configured to communicate with the first remote device and the second remote device without being in communication with the Internet.

17. The communication system of claim 14, wherein:
the KVM local device comprises a secure data communications device that is configured to be switched from communicating with the first remote device to communicating with the second remote device without manipulating or inserting data communicated through a communication medium between the KVM local device and the first remote device and between the KVM local device and the second remote device.

18. The communication system of claim 17, wherein:
the KVM local device that comprises the secure data communication device is further configured to change communications from between the KVM local device and the first remote device to between the KVM local device and the second remote device via the communication medium without using a communication path separate of the communication medium for the pattern of interruption between the KVM local device and the corresponding remote device that the KVM local device is in communication with.

19. The communication system of claim 12, wherein:
the KVM local device is further configured to be toggled between the first state and the second state a minimum number of times over a predetermined period of time.

20. The communication system of claim 19, wherein:
the predetermined period of time comprises 18 milliseconds.

21. A communication system, comprising:
a receiver configured to receive data at a second end of a communication medium, the communication medium also having a first end, the receiver having a loss of signal (LOS) status notification configured to detect a pattern of interruption of the communication medium at the second end, wherein the pattern of interruption of the communication medium originates at the first end;
the receiver configured to use a detection of a respective loss of signal at the second end for detecting the pattern of interruption of the communication medium at the second end so as to determine control information associated with the pattern of interruption, and in response to the detection to facilitate a change to which remote device of a plurality of remote devices, at the second end of the communication medium, a local device, at the first end of the communication medium, is in communication via the communication medium.

22. The communication system of claim 21, wherein the receiver is an Internet free device that is configured to communicate with the communication medium without communication through the Internet.

23. The communication system of claim 21, wherein the receiver comprises a receiver extender, (RX).

24. The communication system of claim 23, wherein the receiver extender comprises a keyboard, video, mouse, (KVM), receiver extender.

25. The communication system of claim 23, wherein the receiver extender comprises a communication module having at least one interface for communicating with the local device via the communication medium.

26. The communication system of claim 25, wherein the at least one interface comprises one or more of; a peripheral interface, a video monitor interface, a mouse interface, and a keyboard interface.

27. The communication system of claim 23, wherein the receiver extender comprises a microprocessor or a field programmable gate array configured for communicating between a peripheral device, a monitor, a mouse, and a keyboard, associated with the local device, and the communication medium.

28. The communication system of claim 27, wherein the receiver extender further comprises a computer memory configured for execution of instructions for performing the operational functions of the receiver extender.

29. The communication system of claim 28, wherein the receiver extender further comprises a small form-factor pluggable, (SFP), transceiver.

30. The communication system of claim 29, wherein the SFP transceiver comprises a loss of signal, (LOS), status notification output that indicates a status of a signal on the communication medium.

31. A communication system, comprising:
a keyboard, video, mouse, (KVM), local device;
wherein the KVM local device is configured to be toggled between a first state and a second state so as to generate a toggling pattern, the KVM local device being configured to be maintained in the first state during a first duration, and to be maintained in the second state during a second duration that matches the first duration;
wherein the toggling pattern comprises multiple consecutive first and second state signals with a same pulse width that represents control information associated with switching communications from between the KVM local device and a first remote device, to between the KVM local device and a second remote device, in response to the toggling pattern being detected.

32. The communication system of claim 31, wherein the KVM local device is further configured to be toggled between the first state and the second state a minimum number of times over a predetermined period of time.

33. The communication system of claim 32, wherein the predetermined period of time comprises 18 milliseconds.

34. The communication system of claim 31, wherein the toggling pattern is an On and Off pattern of interruption that generates multiple consecutive On/Off bits having On/Off signals with a same pulse width that represents control information.

35. The communication system of claim 31, wherein the KVM local device comprises an Internet free device that is configured to be switched from communicating with the first remote device to communicating with the second remove device without communication through the Internet.

36. The communication system of claim 31, wherein the KVM local device is configured to communicate with the first remote device and the second remote device without being in communication with the Internet.

37. The communication system of claim 31, wherein the KVM local device comprises a secure data communications device that is configured to be switched from communicating with the first remote device to communicating with the second remote device without manipulating or inserting data communicated through a communication medium between the KVM local device and the first remote device and between the KVM local device and the second remote device.

38. The communication system of claim 37, wherein the KVM local device that comprises the secure data communication device is further configured to change communications from between the KVM local device and the first remote device to between the KVM local device and the second remote device via the communication medium without using a communication path separate of the communication medium for the pattern of interruption between the KVM local device and the corresponding remote device that the KVM local device is in communication with.

* * * * *